United States Patent [19]

Siegenthaler

[11] Patent Number: 5,346,663
[45] Date of Patent: Sep. 13, 1994

[54] METHOD OF PRODUCING A SPLICELESS ANNULAR TREAD CAP

[75] Inventor: Karl J. Siegenthaler, Rome - Ostia, Italy

[73] Assignee: Bridgestone Corporation, Tokyo, Japan

[21] Appl. No.: 967,358

[22] Filed: Oct. 27, 1992

[30] Foreign Application Priority Data

Oct. 31, 1991 [IT] Italy ............................ TO91A 000823

[51] Int. Cl.⁵ ................................................ B29D 30/00
[52] U.S. Cl. ................................ 264/150; 264/159; 264/209.3; 264/310; 264/312; 425/31; 425/32; 425/38; 425/297
[58] Field of Search ............... 425/28.1, 31, 32, 35, 425/38, 296, 297; 264/310, 312, 150, 159, 145, 148, 209.2, 209.3

[56] References Cited

U.S. PATENT DOCUMENTS

| | | | |
|---|---|---|---|
| 1,330,886 | 2/1920 | Macbeth et al. | 264/310 |
| 1,335,734 | 10/1920 | Cole | 264/310 |
| 2,710,425 | 6/1955 | Rhodes | 425/39.1 |
| 2,717,022 | 9/1955 | Duerksen | 156/407 |
| 2,808,872 | 10/1957 | Clapp | 156/407 |
| 3,279,501 | 10/1966 | Donald | 264/312 |
| 3,468,997 | 9/1969 | Pickels | 264/312 |
| 3,829,271 | 8/1974 | Taylor | 425/31 |
| 3,909,337 | 9/1975 | Yabe | 425/31 |
| 3,991,150 | 11/1976 | De Putter | 264/68 |
| 3,994,653 | 11/1976 | Marangoni | 425/335 |
| 4,038,001 | 7/1977 | Stinnes | 264/312 |
| 4,398,492 | 8/1983 | Casey | 118/105 |
| 4,462,776 | 7/1984 | Fujimoto et al. | 425/31 |
| 5,063,014 | 11/1991 | Cakmakci | 264/151 |
| 5,104,600 | 4/1992 | Remond | 264/310 |
| 5,207,849 | 5/1993 | Siegenthaler | 264/310 |

FOREIGN PATENT DOCUMENTS

0507111 10/1992 European Pat. Off. .
1502123 2/1978 United Kingdom .
2133357 7/1984 United Kingdom .

OTHER PUBLICATIONS

Database WPI Section Ch, Week 7037, Derwent Publications Ltd., London, AN 70-65218R (37) Sep. 1970.
Patent Abstracts of Japan, vol. 7, No. 24 (M-189) (1169) Jan. 29, 1983.

Primary Examiner—Jay H. Woo
Assistant Examiner—Duane S. Smith
Attorney, Agent, or Firm—David A. Thomas

[57] ABSTRACT

A method of producing a spliceless annular tread cap (2), whereby a portion (23) of an extruded tube (21) of green elastomeric material is fed inside an annular body (8), the inner annular surface (17) of which presents a diameter approximately equal to but no smaller than the outside diameter of the tubular portion (23), and negatively reproduces the pattern of the finished tread cap (2). The tubular portion (23) is expanded and calendered against the inner surface (17) of the annular body (8) by means of a roller (34) moved into a position coplanar with and eccentric in relation to the annular body (8).

5 Claims, 2 Drawing Sheets

METHOD OF PRODUCING A SPLICELESS ANNULAR TREAD CAP

BACKGROUND OF THE INVENTION

Technical Field

The present invention relates to a method of producing a spliceless annular tread cap. In particular, the present invention relates to a method enabling a spliceless annular tread cap to be produced easily, cheaply, and to a relatively high degree of accuracy.

SUMMARY OF THE INVENTION

According to the present invention, there is provided a method of producing a spliceless annular tread cap, characterized by the fact that it comprises the steps of feeding a tubular portion of green elastomeric material inside an annular body, the inner annular surface of which presents a diameter approximately equal to, but no smaller than, the outside diameter of said tubular portion, and negatively reproduces the pattern of the finished tread cap; fitting said tubular portion inside said annular body and about a roller coplanar with and eccentric in relation to said annular body; and rolling said roller along the inner surface of said annular body, so as to radially expand and calender said tubular portion against the inner surface of said annular body.

BRIEF DESCRIPTION OF THE DRAWINGS

A non-limiting embodiment of the present invention will be described by way of example with reference to the accompanying drawings, in which.

DESCRIPTION OF THE PREFERRED EMBODIMENT

Figure 1:
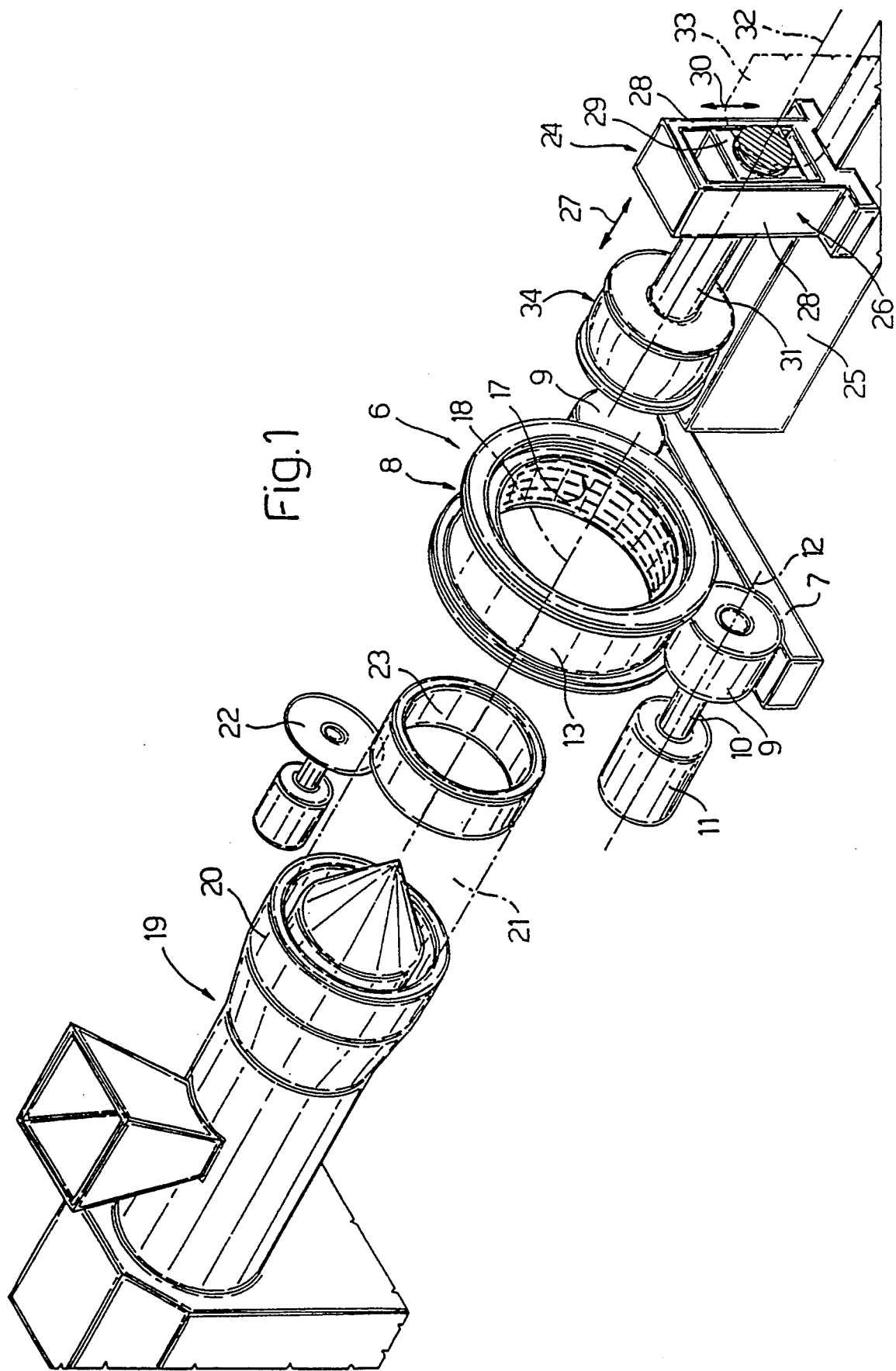
FIG. 1 shows a schematic view in perspective of a system for producing a spliceless tread cap using the method according to the present invention.
Figure 3:
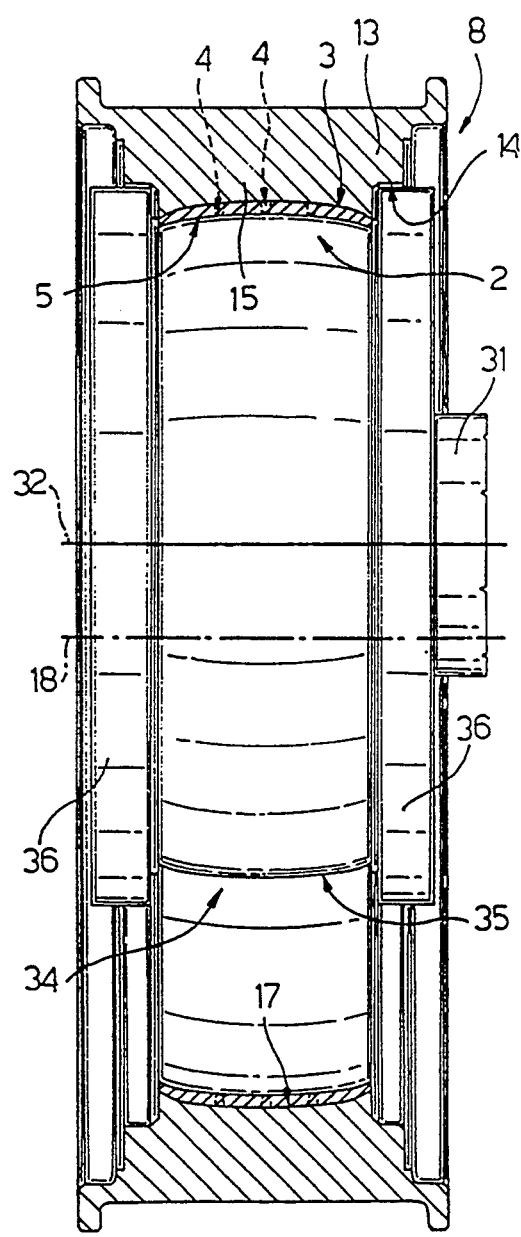

Number 1 in FIG. 1 indicates a system for producing a spliceless annular tread cap 2 (FIG. 3). As shown in FIG. 3, tread cap 2 presents an outwardly-convex, substantially barrel-shaped outer surface 3 having grooves 4 defining the tread pattern; and has an inwardly-concave, substantially barrel-shaped inner surface 5 coaxial with surface 3.

As shown in FIG. 1, system 1 comprises a forming unit 6 comprising a frame 7, and an annular forming body 8 supported on frame 7 via the interposition of at least two supporting and assembly rollers 9, one of which is connected to the output shaft 10 of a motor 11, so as to rotate at a given constant speed about its axis 12.

Figure 2:
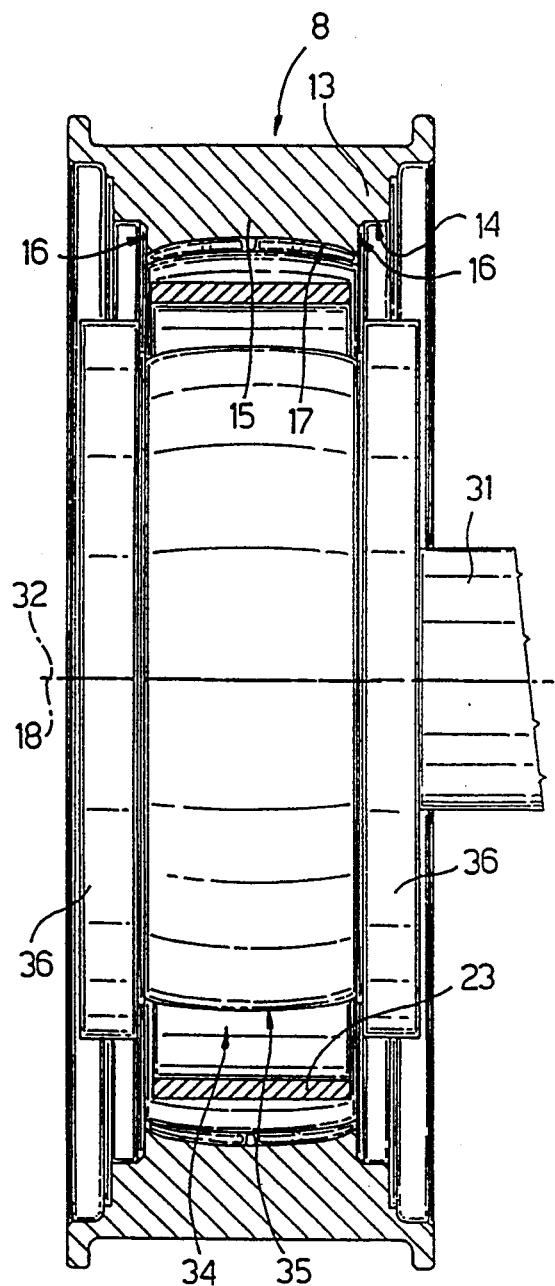
FIGS. 2 and 3 show larger-scale cross sections of a detail in FIG. 1 in two different operating positions.

As shown more clearly in FIGS. 2 and 3, annular body 8 comprises a cylindrical ring 13 having a substantially rectangular axial half-section, and defined internally by a cylindrical surface 14 having a central annular rib 15, the opposite axial ends of which define two annular axial shoulders 16. Rib 15 is defined internally by an annular surface 17 constituting the inner surface of annular body 8 and having a substantially barrel-shaped axial half-section mating with surface 3 of tread cap 2. Surface 17 is coaxial with axis 18 of annular body 8, and negatively reproduces the central portion of outer surface 3 of tread cap 2.

System 1 also comprises an extrusion unit 19 having an annular die 20 for producing a continuous tube 21 of elastomeric material. As tube 21 comes out of die 20, tube 21 is cut, by a cutting device 22 between units 6 and 19, into tubular portions 23, the length of which is approximately equal to and normally no smaller than the width of rib 15. The outside diameter of tubular portions 23 is approximately equal to but no larger than the minimum inside diameter of rib 15, and the thickness is greater than that of tread cap 2.

System 1 also comprises a calendering unit 24 arranged facing extrusion unit 19 on the opposite side of unit 6. Unit 24 comprises a base 25 on which is mounted a first slide 26 moved back and forth, by an actuating device not shown, in direction 27 parallel to axes 12 and 18. Slide 26 comprises uprights 28, between which is mounted a second slide 29 moved back and forth, by an actuating device not shown, in direction 30 perpendicular to direction 27 and substantially radial in relation to axis 18.

Slide 29 is fitted with a rotary shaft 31 having its axis 32 parallel to axis 18. Shaft 31 is connected at one end to a motor 33 supported on slide 29, and is fitted on the other end with a calendering roller 34. Roller 34 is rotated by motor 33 about axis 32 in the same direction as annular body 8, and at a surface speed substantially equal to the inner surface speed of annular body 8. Roller 34 also moves radially, in direction 30, to and from an idle position substantially coaxial with axis 18; and axially, in direction 27, between a backup position outside annular body 8, and a forward position inside and coplanar with annular body 8.

Roller 34 presents an outwardly-convex, substantially barrel-shaped outer surface 35 having an axial half-section so shaped as to mate with that of surface 5. Surface 35 presents a maximum outside diameter smaller than the inside diameter of tube 21, and is defined axially by two flanges 36, each rolling against cylindrical inner surface 14 of ring 13 and a respective shoulder 16, so as to define, with shoulder 16, a cutter for cutting off tread cap 2 any excess elastomeric material expelled during calendering from the chamber defined between surfaces 17 and 35 at the instantaneous contact zone between roller 34 and annular body 8.

As regards to the diameter of roller 34, which must obviously always be smaller than the inside diameter of tube 21, experience has shown that the best results are obtained when the diameter of roller 34 is at least 70% of surface 17.

In actual use, portion 23 is fed inside annular body 8, with which it is arranged substantially coaxial when detached from the rest of tube 21 (FIG. 2). At this point, slide 26 is moved in direction 27 towards annular body 8, so as to insert roller 34 inside both annular body 8 and tubular portion 23, and into a position wherein roller 34 is substantially coaxial with annular body 8 (FIG. 2).

Slide 29 is then moved in direction 30 to position roller 34 eccentrically in relation to annular body 8 (FIG. 3), with flanges 36 contacting surface 14, and portion 23 pressed between surfaces 17 and 35. Annular body 8 is then rotated about axis 18, and roller 34 about eccentric axis 32, so as to substantially roll surface 35 over surface 17, and expand portion 23 against surface 17, and at the same time, calender portion 23 between surfaces 17 and 35 to produce a totally spliceless tread cap 2.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method of producing a spliceless annular tread cap, comprising the steps of extruding a continuous spliceless tube of elastomeric material; cutting said continuous tube into spliceless preformed tubular portions; feeding one of said preformed spliceless tubular portions directly inside an annular body, an inner annular surface of said annular body presenting a diameter approximately equal to but no smaller than, the outside diameter of said tubular portion, and negatively reproduces the pattern of the finished tread cap; fitting said tubular portion inside said annular body and about a roller positioned within said annular body; bringing said roller into contact with said tubular portion; and rolling said roller along the inner surface of said annular body, so as to radially expand and calendar said tubular portion against the inner surface of said annular body.

2. A method as claimed in claim 1 in which said tubular portion presents a length approximately equal to but no smaller than, the length of said inner surface of said annular body, and a thickness greater than that of said annular tread cap.

3. A method as claimed in claim 1 in which said roller is rolled over said inner surface of said annular body, for calendering said tubular portion against said inner surface of said annular body, by rotating said annular body in a given direction abut a first axis, and by rotating said roller about a second axis eccentric in relation to said first axis, in the same direction as said annular body, and at a surface speed substantially equal to the inner surface speed of said annular body.

4. A method as claimed in claim 1 comprising the further step of removing from said tread cap any excess material of said tubular portion via cutting means defined by said annular body and said roller.

5. A method as claimed in claim 1 in which the outside diameter of said roller is equal to at least 70% of the diameter of said inner surface of said annular body.

* * * * *